United States Patent [19]
Drda et al.

[11] 3,962,559
[45] June 8, 1976

[54] TEMPERATURE CONTROL CIRCUIT AND OVEN

[75] Inventors: Benedict J. Drda, Medina, Ohio; Maxwell Meredith, Chelmsford, Mass.

[73] Assignee: LFE Corporation, Waltham, Mass.

[22] Filed: Jan. 3, 1975

[21] Appl. No.: 538,401

[52] U.S. Cl................................ 219/210; 219/501; 219/505; 307/310
[51] Int. Cl.²............................................ H05B 1/00
[58] Field of Search.................. 219/210, 501, 505; 307/310; 357/28

[56] References Cited
UNITED STATES PATENTS

| | | |
|---|---|---|
| 3,243,572 | 3/1966 | Vogt et al............................ 219/210 |
| 3,300,623 | 1/1967 | Smyrnos......................... 219/210 X |
| 3,330,941 | 7/1967 | DelDuca............................. 219/501 |
| 3,449,599 | 6/1969 | Henry................................. 307/310 |
| 3,450,863 | 6/1969 | Scholl................................. 219/501 |
| 3,617,692 | 11/1971 | Landis................................. 219/210 |

*Primary Examiner*—C. L. Albritton
*Attorney, Agent, or Firm*—Richard J. Donahue

[57] ABSTRACT

A transistor with its base-emitter bias controlled by a positive temperature coefficient thermistor provides a controlled heat source for maintaining precise temperature within a small oven which is used to contain and provide a stable temperature for temperature sensitive elements of external circuits.

11 Claims, 5 Drawing Figures

3,962,559

TEMPERATURE CONTROL CIRCUIT AND OVEN

BACKGROUND OF THE INVENTION

1. Field of the Invention

The present invention relates to temperature control ovens and particularly to those which provide stabilized heat for critical elements of independent circuits.

2. Description of the Prior Art

Thermistors have become a common sensing element in temperature control circuitry. Both negative and positive temperature coefficient types are employed to control circuitry which drives heating or cooling devices. Positive temperature coefficient thermistors have been used directly in series with a heating element to reduce current to the heating element as temperature rises. Some thermistors also have a transition level such that resistance is nearly constant until the transition temperature is reached after which resistance can increase as much as 150 percent per degree centigrade over a limited range. Even the largest temperature coefficients of resistance available are not sufficiently great in response for some purposes and the use of additional circuitry to drive heating devices becomes cumbersome in compact integrated circuits of today.

SUMMARY OF THE INVENTION

In the present invention a positive temperature coefficient thermistor is connected to drive the base-emitter junction of a power transistor. The power transistor, collector load resistor, the thermistor, and elements whose temperature is to be controlled are all closely thermally coupled to a small heat sink. The assembly is designed for solder connections to a printed circuit board upon which it is then covered by a thermally insulated cap. In a preferred embodiment, the thermistor has a sensitive transition region at the desired temperature level, the transistor is biased to go into saturation when the thermistor is below its transition region, the collector load resistor is the primary heat source while the transistor is in saturation. Then, as the thermistor enters its transition region, the transistor comes out of saturation and replaces the resistor as the primary heat source. The transistor in this circuit thus acts as both heat source and amplifier responsive to the thermistor.

Thus, it is an object of the invention to provide a compact high gain temperature regulator.

It is a further object to provide a compact sensitive temperature oven for direct connection to a printed circuit board.

Further objects and features of the invention will become apparent upon reading the following disclosure together with the Drawing.

BRIEF DESCRIPTION OF THE DRAWING:

FIG. 5 is a graphical representation of heat dissipation from the collector load resistor and the transistor with time after turn-on.

Figure 1:
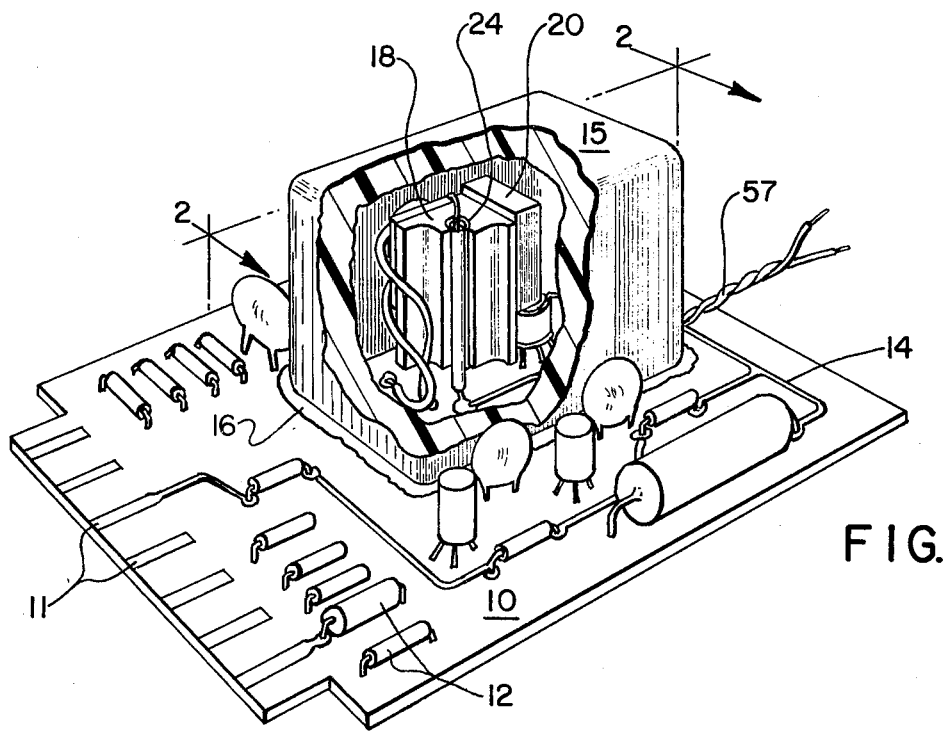
FIG. 1 is a perspective view of a temperature control oven in accordance with the invention mounted on a printed board.

DESCRIPTION OF THE PREFERRED EMBODIMENT:

FIG. 1 depicts typical printed circuit board 10 having plug-in edge connector 11. On the top of board 10 are electronic components 12 connected in a circuit arrangement by printed conductors 14, most of which are on the bottom (not shown) of board 10. The scale of FIG. 1 is approximately 1 to 1 giving a true appearance of the usual sizes involved in utilization of the invention. The critical components of the invention are entirely enclosed in insulated cover 15 which is roughly a one inch cube. One design that has been utilized is 1.13 × 1.56 × 1.25 inches high. Cover 15 is suitably an integral skin foamed plastic made with polyurethane or a similar material. It may also be made of a shell lined with insulating material. The amount of insulation is not critical and one quarter inch cover thickness of integral skin foam is good. Cover 15 is suitably cemented to board 10 by cement 16. However, it may also be mechanically fastened or otherwise attached.

Figure 2:
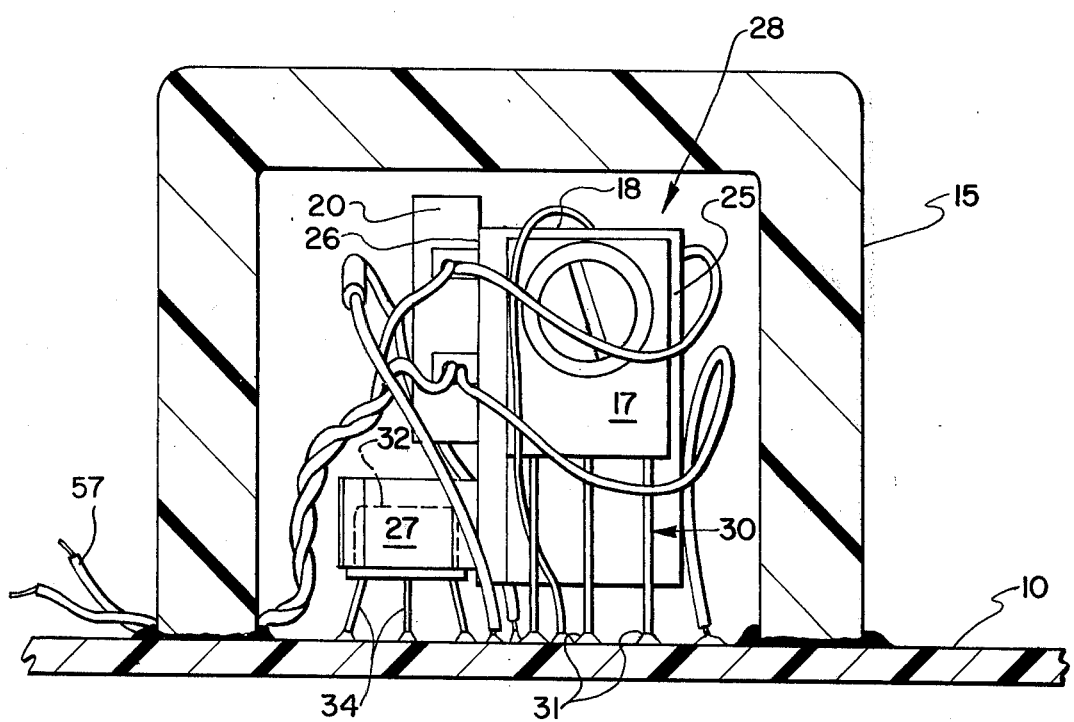
FIG. 2 is a section through 2—2 of FIG. 1.

The interior of cover 15 is depicted by sectional view in FIG. 2 as well as by cut-a-way in FIG. 1. The important elements are transistor 17 screwed to the side of extrusion 18 and encapsulated component 20 which includes thermistor 21 (see FIG. 3). Encapsulated component 20 may include other elements of temperature criticality such as reference thermocouple elements 56 (FIG. 4) with leads 57.

Extrusion 18 is suitably aluminum or other highly thermally conductive material. Extrusion 18 has a substantially L-shaped exterior section with a double-finned interior encompassing cylindrical slot 24 for containing a resistive element in close thermal contact. The shape provides two flat exterior surfaces 25 and 26. Transistor 17 is secured to surface 25 while component 20 is bonded to surface 26. Ferrule clip 27, such as used for glass tube fuses, is also connected to surface 26 by a screw or other suitable means. As with transistor 17 and component 20, it is necessary that clip 27 has good thermal contact with extrusion 18. Usual bonding cements, silicon compounds and the like used for good thermal conductivity are desirable for establishing the above thermal contacts.

Assembly 28 comprising extrusion 18, transistor 17, component 20, clip 27 and a resistive element in slot 24 is still quite small in mass and is readily supported by connection of electrodes 30 to printed circuit board 10. Such connection is depicted as solder connections 31 to conductors 14. Additionally, clip 27 is clipped to TO-5 type can 32 housing an integrated circuit such as an operational amplifier. Leads 34 from can 32 are plugged and/or soldered to conductors 14 of circuit board 10. A separable socket may be used connected to the circuit board. Thus, the leads 31 and 34 provide support securing assembly 28 to circuit board 10.

Figure 3:
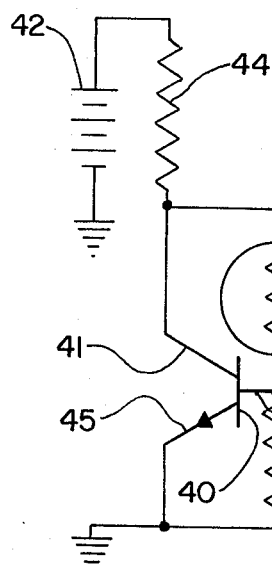
FIG. 3 is a simplified schematic in accordance with one version of the inventive circuit.

A simplified form of the inventive circuit is depicted in FIG. 3. Npn transistor 40 is a power transistor having a DC current gain of at least 100 and power dissipation capability in the range of 40 watts at 25°C. As depicted in FIG. 3, transistor 40 is connected in a common emitter configuration with its collector electrode 41 connected to the positive side of electrical source 42 through resistor 44. Resistor 44 is selected in accordance with the voltage of source 42 and the maximum current capability of transistor 40 to limit current flow to a safe value. A power resistor such as a wirebound resistor of about 1 watt is suitable. Emitter electrode 45 is connected to the negative side of source 42 and base electrode 46 is connected to a biasing network comprising resistor 47 connected from base 46 to emitter 45 and PTC (positive temperature coefficient) thermistor 48 connected between base 46 and collector 41. Thermistor 48 is preferably a switching thermistor such as a doped barium titanate thermistor available from NL Industries, Muskegon, Mich. These thermistors have a relatively temperature insensitive base resistance until the temperature rises to the curie point of the material. At the curie point, the resistance curve switches to a steep slope of 30 percent or more producing decimal orders of magnitude change in resistance with a few degrees change in temperature. Thermistor 48 is selected to have the desired oven temperature lie in the steep portion of the resistance curve above the switching point. Resistor 47 is for biasing only and can be used to set the desired oven temperature. With thermistor 48 connected to collector electrode 41, some negative feedback is produced reducing sensitivity slightly.

Figure 4:
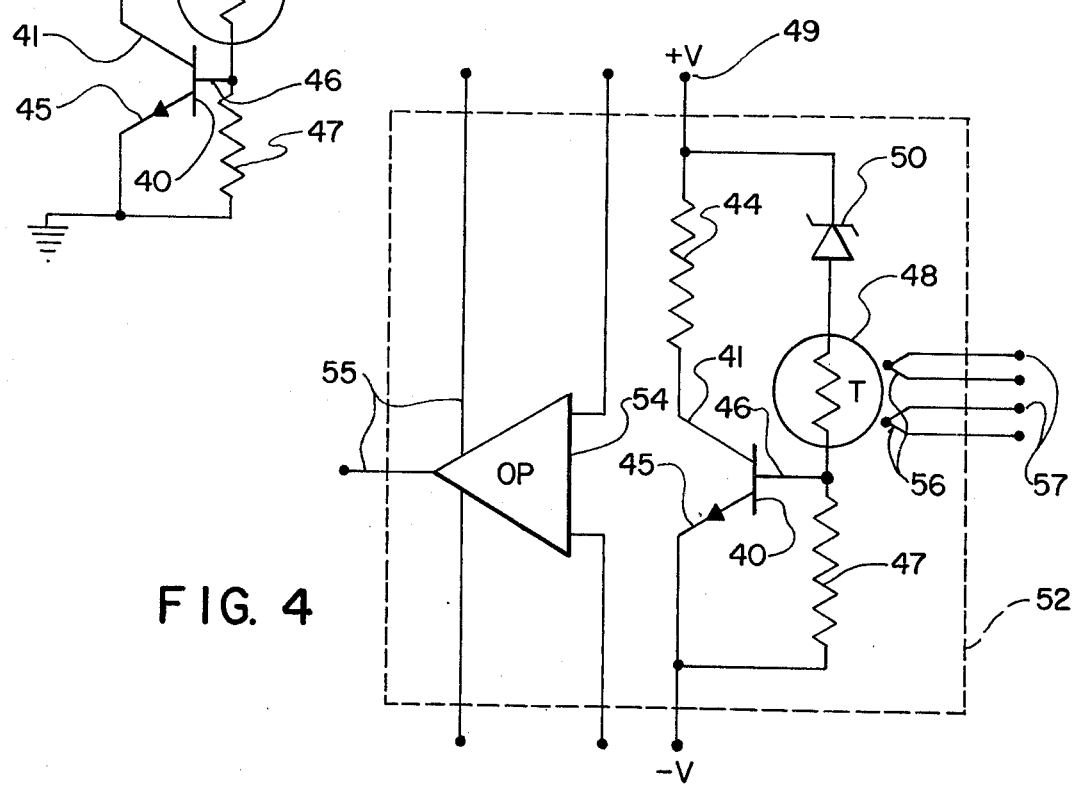
FIG. 4 is a schematic in accordance with a second version of the inventive circuit.

In FIG. 4 a slightly different configuration is shown with thermistor 48 connected directly to positive source terminal 49 through zener diode 50 rather than through current limiting resistor 44. The purpose of zener diode 50 is to provide a fixed voltage drop where the source voltage is higher than desirable for preferred PTC thermistors. For example, if the source voltage were 12 volts, bias resistor 47 were 200 ohms selected to set a desired temperature and the base resistance of PTC thermistor 48 were 200 ohms, transistor 40 would be driven excessively hard and might fail. Unnecessarily large currents through thermistor 48 also produce adverse effects by heating the thermistor independently of the oven temperature.

FIG. 4 depicts the thermally insulated cover 15 by dashed line 52. Also inside dashed line 52 is an integrated circuit 54 depicted as an operational amplifier having connecting leads 55 to the outside of cover 15 and thermocouples 56 having leads 57 to the outside of cover 15. Thermocouple 57 could, by way of example, provide references for precision temperature sensing probes while integrated circuit 54 could provide stabilized amplification in precision instrumentation. Bias resistor 47 and diode 50 are not temperature sensitive in the present circuit; however, all of the other elements depicted in FIG. 4 are in thermal contact with each other at least through the medium of extruded heat sink 18 (FIGS. 1 & 2). Integrated circuit 54 is in can 32 secured to heat 18 by metal clip 27 which provides the necessary thermal path.

In operation, startup is normally at a low temperature such that thermistor 48 is in its low resistance base state so that a strong drive is applied to the base of transistor 40 putting it into saturation. Transistor 40, being in saturation, drops very little of the supply voltage so that most of the voltage is dropped across resistor 44 heating it rapidly. The heat from resistor 44 raises the oven temperature until the switching point (knee) in the resistance curve of thermistor 48 is reached. At this point the resistance of thermistor 48 starts increasing rapidly lowering the drive to transistor 40 so that it comes out of saturation. As transistor 40 comes out of saturation, power dissipation transfers from resistor 44 to transistor 40 so that the oven temperature is then provided almost entirely from transistor 40. Typical curves showing the temperature dissipation by resistor 44 and transistor 40 are illustrated graphically in FIG. 5.

Figure 5:
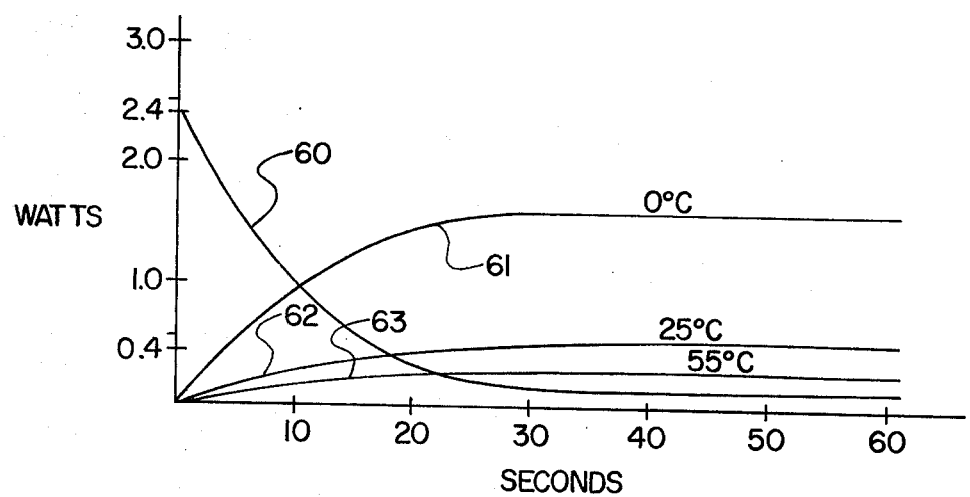

FIG. 5 shows power dissipation in watts from resistor 44 and transistor 40 from the application of source voltage up to 60 seconds thereafter. Curve 60 represents the dissipation from resistor 44 starting at 2.4 watts and decreasing to about 0.1 watt after 60 seconds. Curves 61, 62, and 63 show dissipation in watts from transistor 40 when the controlled oven temperature is approximately 85°C. and the ambient temperature outside cover 15 is 0°C., 25°C., and 55°C. respectively. The dissipation curve for resistor 44 is quite independent of ambient temperature. An exemplary circuit is given below.

EXAMPLE

The circuit of FIG. 4 in which the circuit elements are:

Thermistor 48: PTC switching thermistor with a switching temperature of 75°C., a base resistance of 200 ohms and a minimum slope of 30 percent representing the percentage increase in resistivity per degree centigrade after the switching point.
Transistor 40: Darlington plastic tab power transistor, 4 amp. collector current, 40 watt maximum total power dissipation, DC current gain ($h_{FE}$) 750.
+V: + 12 volts −V: − 12 volts
Resistor 44: 1 watt wirewound 270 ohms Resistor 47: ⅛th watt 1000 ohms
Zener diode 50: IN4746 18 volts A controlled oven temperature of 85°C. was obtained.

The circuit parameters are selected to operate transistor 40 in a linear portion of its characteristic curves an thermistor 48 will operate in a steep portion of its resistance curve during normal operation at the controlled temperature.

While the invention has been described with respect to specific embodiments, it is useful for many different temperature stabilization purposes and various obvious modifications of the structure and circuitry producing similar results are contemplated as set forth in the scope of the following claims.

We claim:
1. A temperature control circuit comprising:
a transistor having a base electrode, an emitter electrode, and a collector electrode,
first and second supply terminals for connection to a source of electrical power,
a load resistor connected between said first supply terminal and said collector electrode,
means connecting said emitter electrode to said second supply terminal,
a zener diode and a positive temperature coefficient thermistor connected in series between said first supply terminal and said base electrode, and
a second resistor connected between said base electrode and said second supply terminal.
2. A temperature control circuit according to claim 1 wherein said transistor is an npn transistor and said first supply terminal is a positive voltage supply terminal relative to said second supply terminal.
3. A temperature control circuit according to claim 1 wherein said transistor is mounted on a heat sink in common with said thermistor and said load resistor forming an assembly which is mounted on a printed circuit board.

4. A temperature control circuit according to claim 3 in which said assembly is enclosed by a thermally insulating cover secured to said printed circuit board.

5. A temperature control circuit according to claim 4 wherein said cover comprises foam plastic.

6. A temperature control circuit according to claim 5 wherein said cover is integral skin polyurethane foam.

7. A temperature control circuit according to claim 3 wherein said thermistor is encapsulated together with at least one temperature sensitive element whose temperature is to be controlled by said temperature control circuit.

8. A temperature control circuit according to claim 7 in which said temperature sensitive element is a reference thermocouple.

9. A temperature control circuit according to claim 3 wherein said assembly is enclosed together with an integrated circuit by a thermally insulating cover whereby the temperature of said integrated circuit is controlled by the temperature of said assembly.

10. A temperature control circuit according to claim 9 wherein said assembly includes a clip secured to said heat sink, said integrated circuit is housed in a TO-5 type can, said can is secured by said clip and said assembly is supported from said printed circuit board by connections of said transistor and said integrated circuit to conductors on said printed circuit board.

11. A temperature control circuit according to claim 3 wherein said transistor is biased in a manner such that heat to said assembly is initially provided by said load resistor upon application of power through said first and second supply terminals and said load resistors continues to provide a substantial amount of heat to the assembly through the first 30 seconds of operation and thereafter heat for controlling the temperature of the assembly is provided substantially entirely by said transistor.

* * * * *